United States Patent [19]

Kikuchi

[11] Patent Number: 5,233,494

[45] Date of Patent: Aug. 3, 1993

[54] DISK CASSETTE WITH SHUTTER

[75] Inventor: Shuichi Kikuchi, Miyagi, Japan

[73] Assignee: Sony Corporation, Tokyo, Japan

[21] Appl. No.: 803,350

[22] Filed: Dec. 4, 1991

[30] Foreign Application Priority Data

Dec. 14, 1990 [JP] Japan .................................. 2-410774

[51] Int. Cl.$^5$ .............................................. G11B 23/03
[52] U.S. Cl. .................................... 360/133; 369/291;
206/444
[58] Field of Search ............... 428/595, 596, 599, 603;
206/444; 360/133; 369/291; 24/563, 545

[56] References Cited

U.S. PATENT DOCUMENTS

| 1,229,312 | 6/1917 | Newhouse | 24/563 |
|---|---|---|---|
| 2,102,936 | 12/1937 | Bailey | 428/595 |
| 2,119,999 | 6/1938 | Nae,uml/e/ der | 428/595 |
| 2,600,980 | 6/1952 | Eyre | 24/563 |
| 4,648,714 | 10/1987 | Sugawara et al. | 360/133 |
| 5,012,913 | 6/1991 | Overland | 369/291 |
| 5,036,421 | 7/1991 | Kaneda et al. | 360/133 |
| 5,077,625 | 12/1991 | Shiba et al. | 360/133 |
| 5,140,490 | 8/1992 | Fujita et al. | 360/133 |

FOREIGN PATENT DOCUMENTS

| 59-72687 | 4/1984 | Japan | 360/133 A |
|---|---|---|---|
| 63-171485 | 7/1988 | Japan | 206/444 |
| 2-201787 | 8/1990 | Japan | 206/444 |
| 3-194783 | 8/1991 | Japan | 206/444 |
| 3-219478 | 9/1991 | Japan | 206/444 |
| 2082371A | 3/1982 | United Kingdom | 206/444 |

Primary Examiner—John Zimmerman
Attorney, Agent, or Firm—Limbach & Limbach

[57] ABSTRACT

A disk cassette with shutter, the shutter comprising a pair of respective shutter plates and a connecting plate, for connecting the pair of shutter plates, and the shutter shaped substantially into a U-form in section. An inward concave portion is provided in each of at least one of the respective shutter plates near and along a curved corner that is formed between the connecting plate and the respective shutter plate.

5 Claims, 6 Drawing Sheets (PRIOR ART) FIG.8
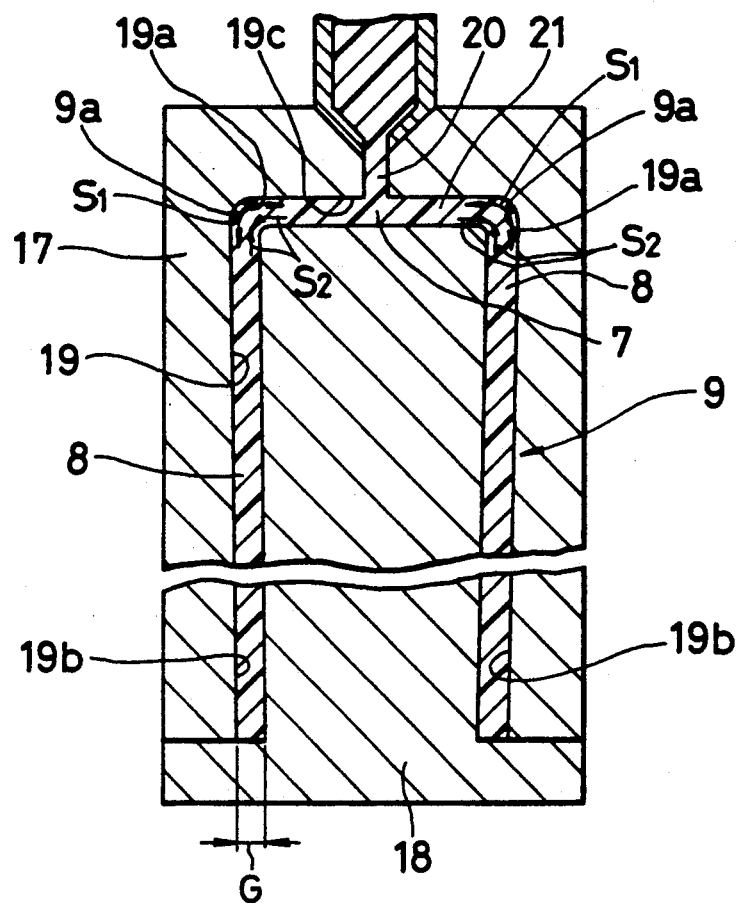
FIG.11   (PRIOR ART)
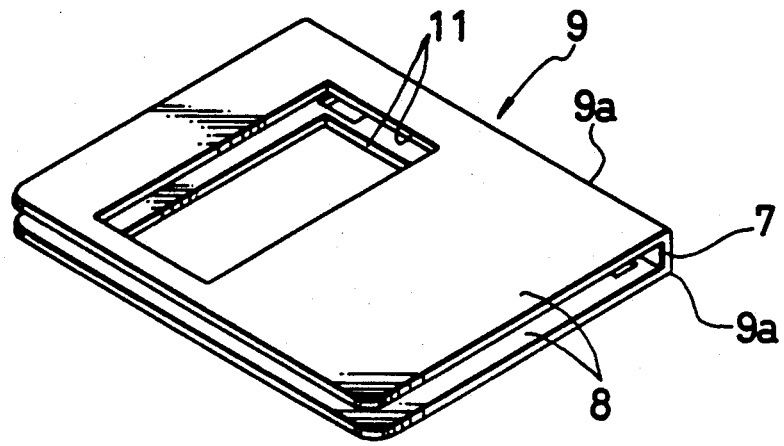

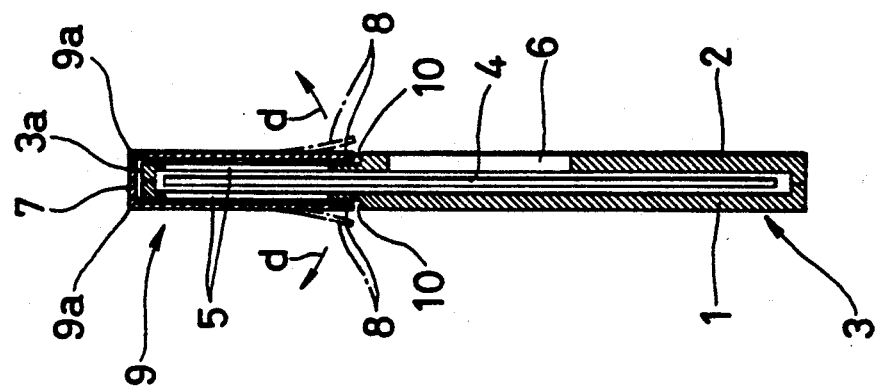
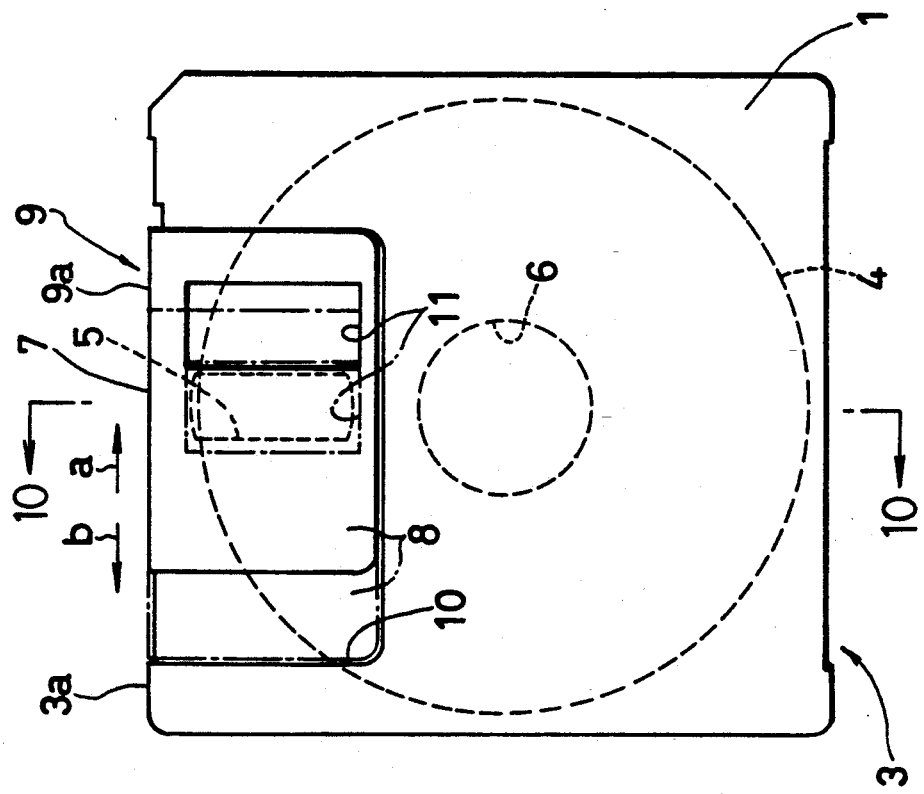

DISK CASSETTE WITH SHUTTER

BACKGROUND OF THE INVENTION

1. Field of the Invention

This invention relates to a disk cassette, specifically to a disk cassette having a shutter where the shutter is shaped into a U-form in section.

2. Description of the Related Art

As disclosed in Japanese Utility Model Registration Publication No. 60-6938, a disk cassette, such as a floppy disk cassette or the like is constituted as illustrated in FIGS. 9 through 11. A thin case 3 shaped substantially into a square-form comprises an upper half 1 and a lower half 2, both halves being made of synthetic resin. Rotatably accommodated in the case 3 is a floppy disk 4 that is a disk-like recording medium, and a pair of upper and lower head insertion openings 5, each of which is shaped substantially into a rectangular-form, are biasedly provided near one side edge 3a of the case 3. Further, a circular turntable insertion opening 6 is disposed in the central portion of the lower half 2.

A thin rectangular shutter 9 comprising a pair of upper and lower shutter plates 8 and a connecting plate 7, the shutter being U-form in section, is secured to cover the outside of the case 3 in the vicinity of the side edge 3a thereof. The upper and lower shutter plates 8 are fitted into respective stepped portions 10 formed in the upper and lower surfaces of the case 3, and the connecting plate 7 is located to be movable along the side edge 3a of the case 3. Thus, the shutter 9 can be moved in a direction of arrows a, b between a closed position, indicated in solid lines and an opened position, indicated in chain-dotted lines in FIG. 9.

When the shutter 9 is slid into the closed position, a pair of upper and lower openings 11 shaped substantially into a rectangular-form and provided in the respective upper and lower shutter plates 8 are moved to a position discrepant from the head insertion opening 5, so that the pair of head insertion openings 5 are closed by the pair of shutter plates 8, respectively. When the shutter 9 is slid into the opened position, openings 11 coincide with the head insertion openings 5, so that the head insertion openings 5 are opened. It is noted that the shutter 9 is located in the closed position due to force of a spring (not shown) which is accommodated in the case 3 to urge the shutter 9 in the direction of arrow a.

There are at least two kinds of shutters 9: one is made of a stainless steel sheet by the help of press working, and another is made of synthetic resin. Further, there are at least two kinds of production methods to make the shutter 9 of the synthetic resin.

One method of producing the shutter 9 of the synthetic resin is such that a synthetic resin plate 13 (FIG. 6) having a thickness T of less than 0.3 mm and made of polypropylene, vinylchloride or the like is press-worked, then horizontally mounted on a first jig 14 as shown in FIG. 6. After sandwiching the central portion of the plate 13 between the first jig 14 and a heated second jig 15, both end portions of the plate 13 are bent in a direction of arrow c with a pair of third jigs 16 as shown in FIG. 7, in order to obtain a shutter that is of U-shape in section.

Another method of producing the shutter 9 of the synthetic resin is such that a molten synthetic resin, such as polyacetal, polypropylene, polyethylene or the like is injected into a U-shaped cavity 19 through an injection gate 20, shown in FIG. 8, to make a shutter that is of U-shape in section. It is noted that the cavity 19 is formed between metallic molds 17, 18 and has a gap G of less than 0.3 mm.

However, if the shutter 9 is made by means of bending the synthetic resin sheet 13 while the synthetic resin sheet 13 is heated, residual stresses are produced, after bending, in corners 9a shown in FIG. 7, where the respective shutter plates 8 are connected to the connecting plate 7. This is because the outer side of the corner 9a is cooled at high speed, whereas the inner side thereof is cooled at low speed.

If the shutter 9 is made by means of injecting the synthetic resin into the metallic mold 17, 18 as shown in FIG. 8, residual stresses are also produced in the corners 9a after molding, because the molten synthetic resin 21 flows at high speed and turns sharply along the corner portion 19a of the cavity 19, and further, the molten synthetic resin 21 that fills the corner portion 19a cools more quickly than the synthetic resin that fills plain portions 19b, 19c of the cavity 19.

The residual stresses existing in the corner 9a of the shutter 9 act as a force for transferring the shutter plates 8 in a direction of arrow d in FIG. 7, so that if the disk cassette is used at high temperature, the shutter plates 8 of the shutter 9 are easily deformed in the direction of arrow d as indicated in dot-dash lines in FIG. 10. As the result, sometimes the disk cassette is difficult to draw from a recording and/or reproducing apparatus, and sometimes the shutter drops off of the case 3.

OBJECTS AND SUMMARY OF THE INVENTION

Accordingly, it is an object of the present invention to provide a disk cassette, having a substantially U-shaped shutter, where if the shutter is deformed due to residual stresses exist in the corner thereof, the amount of deformation is always very small.

Another object of the invention is to provide a disk cassette, having a substantially U-shaped shutter, in which the residual stresses in the shutter are not concentrated only at corners formed between a pair of shutter plates and respective ends of a connecting plate, so that even if the disk cassette is used in a high temperature environment, the shutter will not deform and make it difficult to draw the disk from a recording and/or reproducing apparatus, and the shutter will not drop off of the case of the disk cassette.

In accordance with an aspect of this invention, in a disk cassette having a shutter, the shutter comprises a pair of shutter plates and a connecting plate for connecting the pair of shutter plates, shaped substantially into a U-form in section, least an inwards concave portion is provided in at least one of the shutter plates near and along a curved corner that is formed between the connecting plate and the shutter plate.

Thus, residual stresses produced in the inwards concave portion of the shutter plate compensate for those produced in a curved corner formed between the shutter plate and the connecting plate of the shutter, so that the shutter plates are hardly deformed in a high temperature environment.

The above, and other objects, features and advantages of this invention, will be apparent from the following detailed description of illustrative embodiments thereof to be read in connection with the accompanying drawings, wherein like reference numerals identify the same or corresponding parts in the several views.

BRIEF DESCRIPTION OF THE DRAWINGS

FIG. 8 is a sectional side view illustrating an injection molding process of manufacturing of a previously proposed shutter;

FIG. 9 is a plan view of a disk cassette into which the shutter of FIG. 1 is incorporated;

FIG. 10 is a sectional view taken along the line A—A on FIG. 9; and

FIG. 11 is a perspective view of a previously proposed shutter.

DETAILED DESCRIPTION OF PREFERRED EMBODIMENTS

A disk cassette having a shutter embodying the present invention will be hereinafter described with reference to FIGS. 1 through 11.

Figure 1:
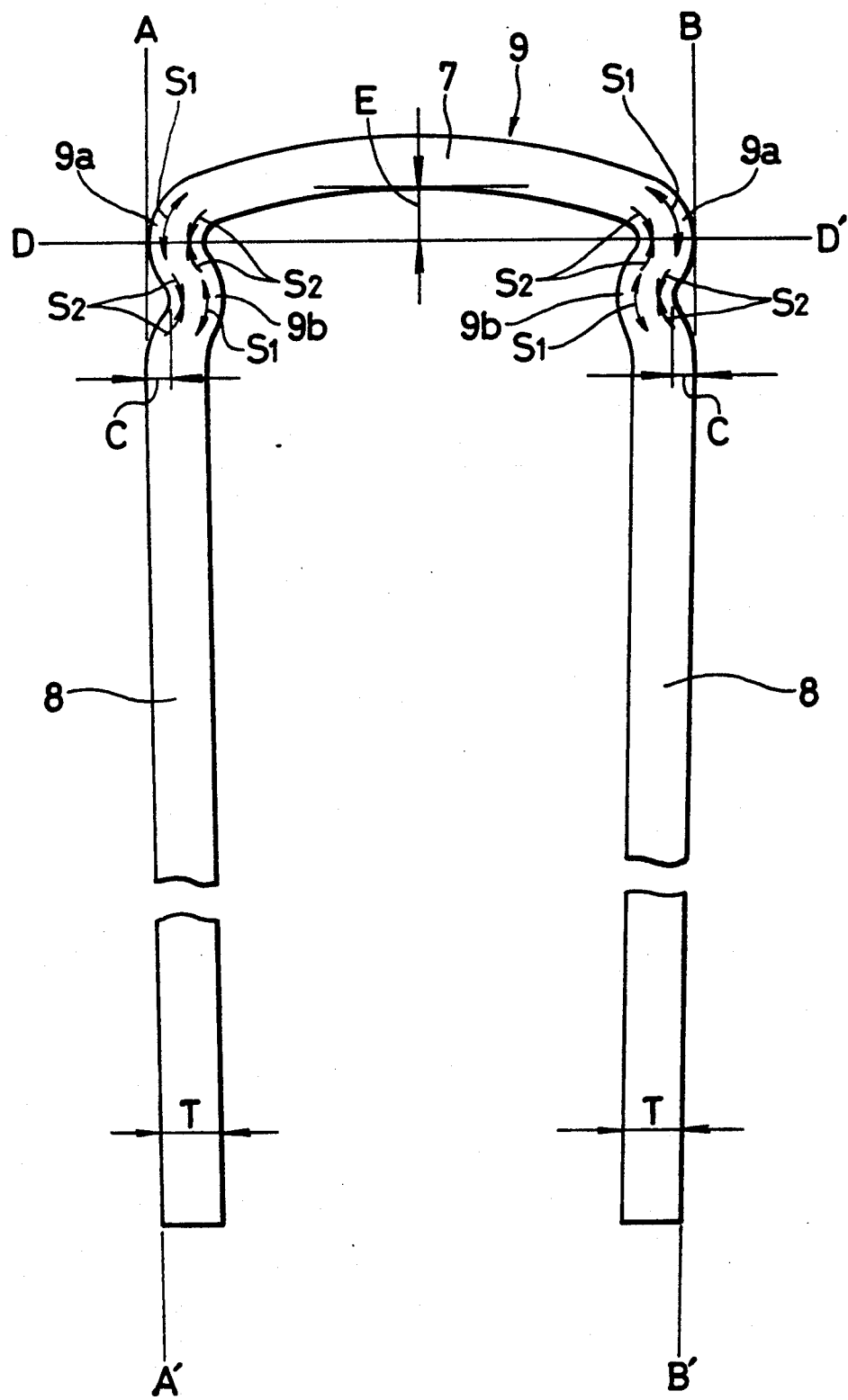
FIG. 1 is an enlarged side view of a shutter according to an embodiment of this invention.
Figure 2:
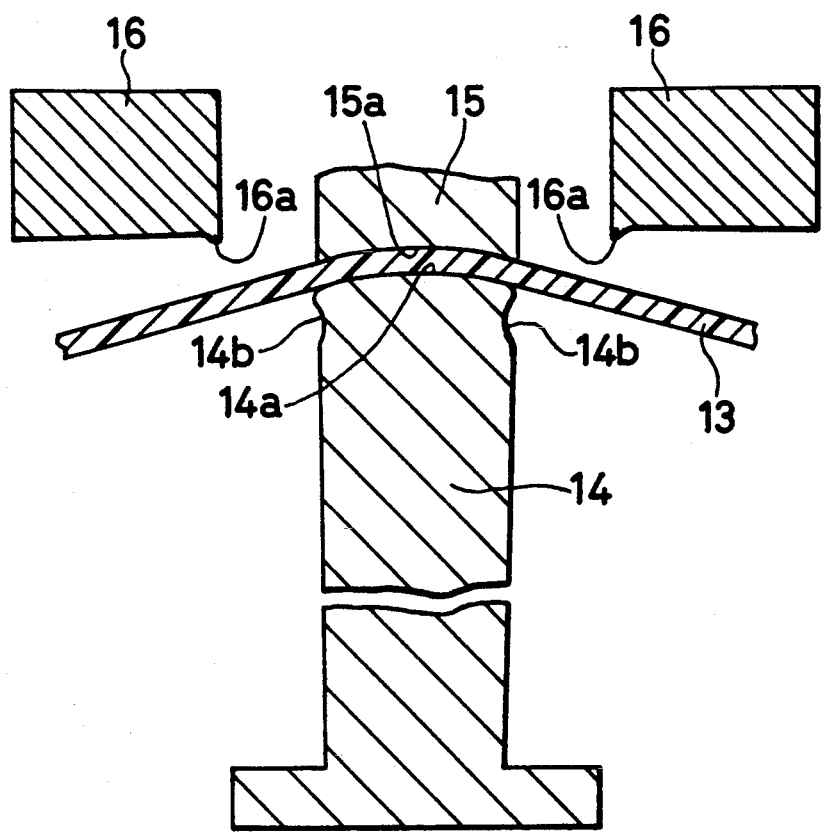
FIGS. 2 and 3 are sectional side views illustrating a bending process of manufacturing the shutter of FIG. 1.
Figure 3:
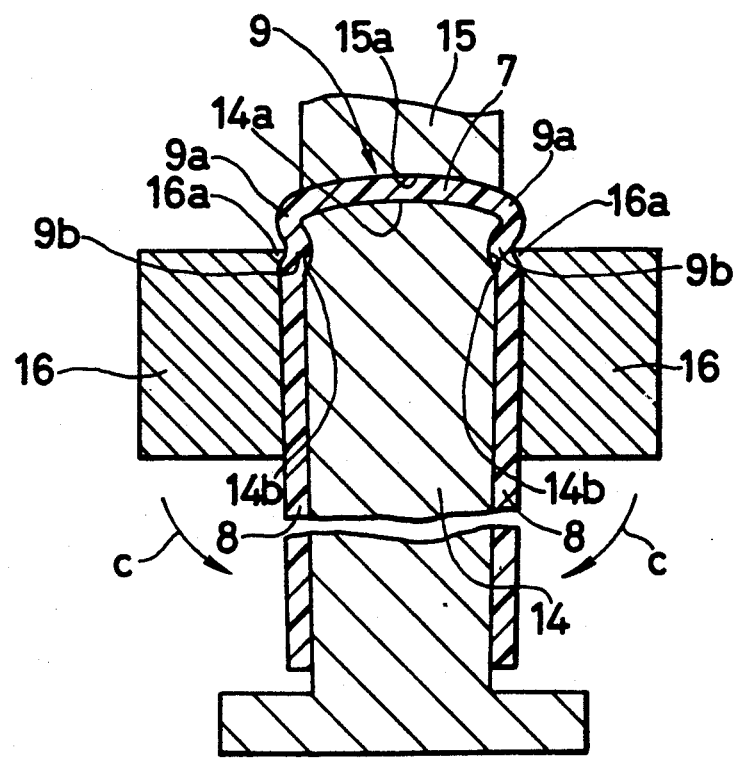
Figure 4:
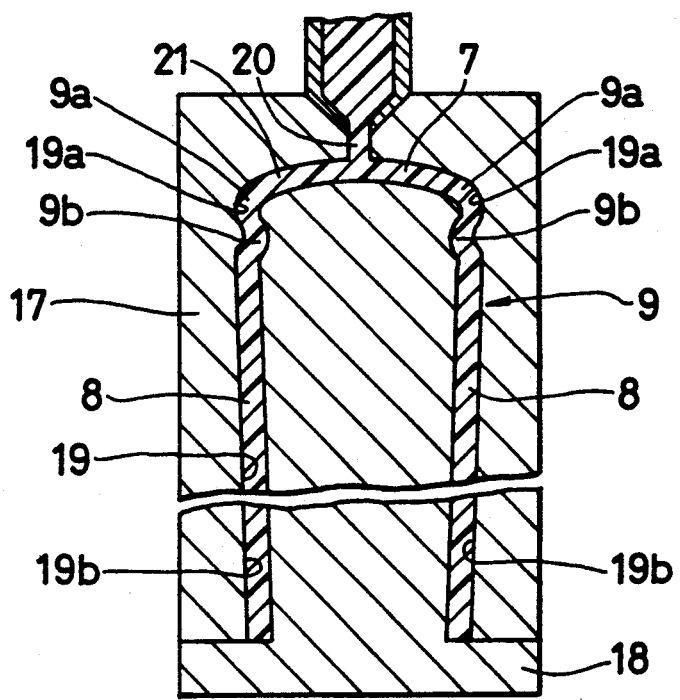
FIG. 4 is a sectional side view illustrating an injection molding of the shutter of FIG. 1.

A shutter 9 shaped substantially into a U-form in section as shown in FIG. 1 is made in such a manner that a synthetic resin plate 13 is heated, and then, bent as shown in FIGS. 2 and 3, or molded out of synthetic resin in such a manner that molten synthetic resin is injected into a cavity 19 formed between metallic molds 17 and 18 as shown in FIG. 4.

As shown in FIG. 1, each of a pair of shutter plates 8 is connected to a connecting plate 7 through a gently curved corner 9a, near and along which a gently curved portion 9b that curves in the very reverse of the curved corner 9a is provided.

The depth C of the curved portion 9b of the shutter 9 from a reference surface A—A', B—B' including the outer surface of the shutter plate 8 and the top line of the externally projecting portion of the curved corner 9a is smaller than the thickness T of the shutter plate 8. The connecting plate 7 is gently curved upwards in FIG. 1, so as to have a camber E with respect to a reference surface D—D' including the pair of top lines of the curved corner 9a. The curved portion 9b may be provided only on one of the pair of shutter plates 8, curved portions 9b may be provided in each of the pair of shutter plates 8.

When the shutter 9 is formed as described above, residual tensile stresses $S_1$ and compressive stresses $S_2$ produced in the curved corner 9a and the curved portion 9b, respectively, of the shutter 9 compensate for each other, so that the pair of shutter plates 8 are prevented from deforming in a direction of arrow d as indicated in chain-dotted lines in FIG. 10, even if the shutter 9 is at a high temperature.

As shown in FIG. 2, the synthetic resin plate 13 is mounted on the top surface 14, having a cylindrical convex shape, of a jig 14, and the central portion of the synthetic resin plate 13 is pressed from above by a heated jig 15 through a bottom surface thereof, having a cylindrical concave shape. Thereafter, both end portions of the synthetic resin plate 13 are bent in the direction of arrow C in FIG. 3 by a pair of jigs 16 until both end portions are pressed against the side surfaces of the jig 14, respectively. Then the end portions are partially pushed into recesses 14b formed just under both ends of the top surface of the jig 14 by a projection 16a projecting from the pair of jigs 16, respectively.

When the shutter 9 is molded out of synthetic resin, the curved corner 9a, the curved portion 9b, and the camber of the connecting plate 7 of the shutter 9 are chosen by selecting the shape of the cavity 19 formed between the metallic molds 17 and 18.

Figure 5:
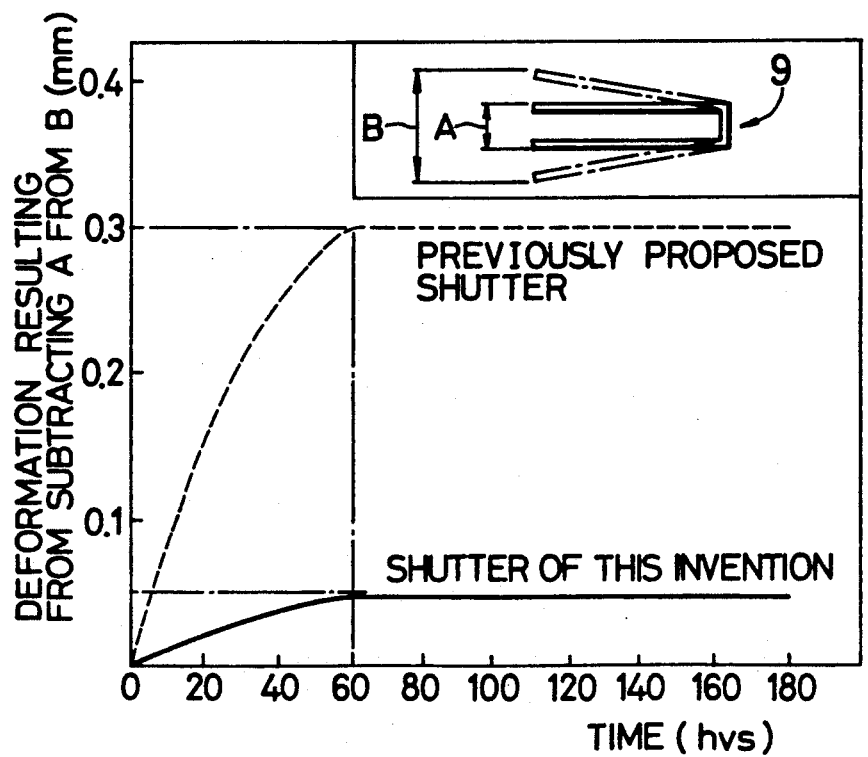
FIG. 5 is a graphical representation of a time-inclination of between the shutter plates of the shutter of FIG. 1.
Figure 6:
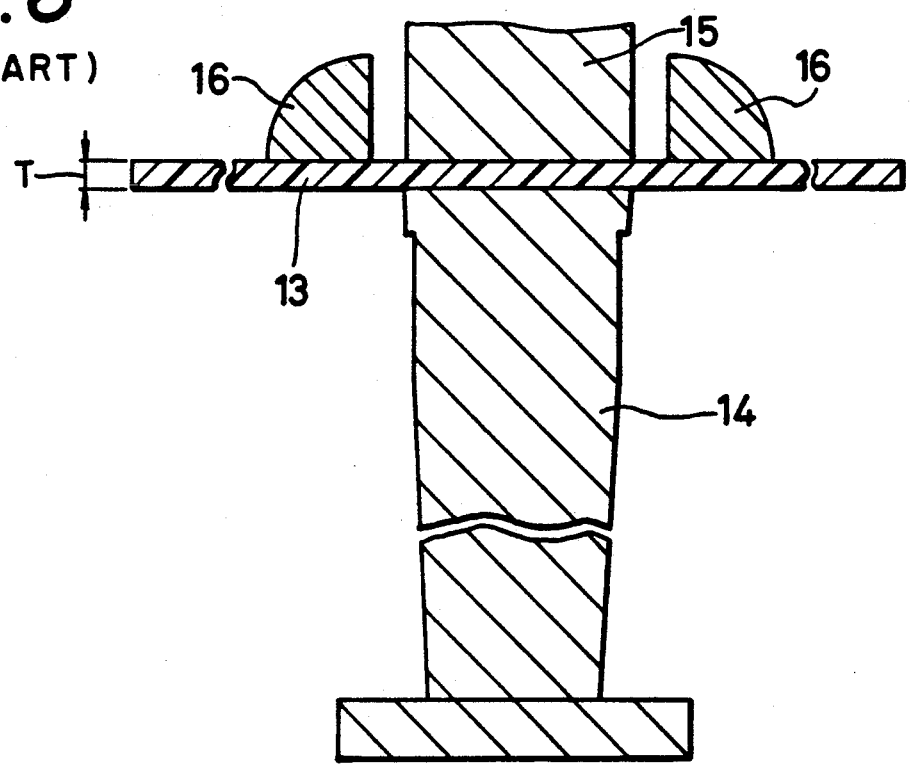
FIGS. 6 and 7 are sectional side views illustrating a bending process of manufacturing a previously proposed shutter.
Figure 7:
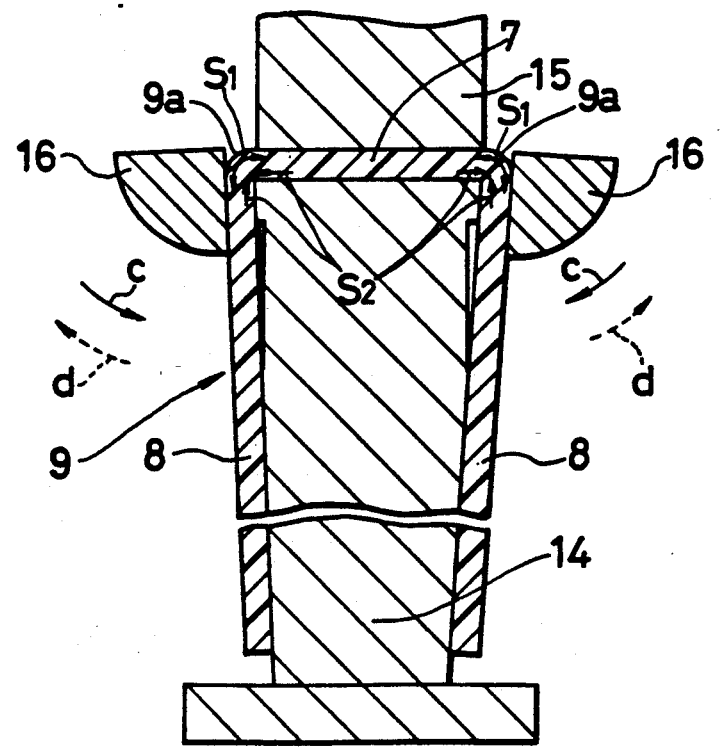

FIG. 5 is a graphical representation of a time-inclination relationship between the pair of shutter plates. A result obtained from the shutter of this invention is indicated in solid lines in FIG. 5 and is compared with a result obtained from a previously proposed shutter indicated in chain-dotted lines.

In case of the shutter plates of the previously proposed shutter, the free ends of the shutter plates are displaced in length of about 0.33 mm after heating for about sixty hours at a temperature of 70° C., whereas the free ends of the shutter plates of this invention is displaced in length less than 0.05 mm, even when the shutter plates are heated for more than 180 hours.

Various modifications are possible within the scope of the appended claims. For example, the present invention can be applied to a disk cassette having a shutter made of a metal sheet, such as a stainless-steel sheet or the like, using a press working apparatus.

Moreover, this invention may be applied to various kinds of disk cassettes in which various kinds of disklike recording mediums, such as a hard disk and the like are respectively accommodated.

What is claimed is:

1. A disk cassette having a shutter, said shutter comprising a pair of respective shutter plates and a connecting plate, for connecting the pair of shutter plates, and said shutter shaped substantially into a U-form in section, wherein an inward concave portion is provided in at least one of said respective shutter plates near and along a curved corner that is formed between said connecting plate and each of said respective shutter plates.

2. A disk cassette according to claim 1, wherein said shutter is made of synthetic resin.

3. A disk cassette according to claim 2, wherein said shutter is made by injection molding.

4. A disk cassette according to claim 2, wherein said shutter is made of a synthetic resin sheet through a bending process.

5. A disk cassette according to claim 1, wherein said shutter is made of a stainless-steel sheet through a bending process.

* * * * *